United States Patent
Imai et al.

(10) Patent No.: US 11,708,880 B2
(45) Date of Patent: Jul. 25, 2023

(54) ROTARY ACTUATOR

(71) Applicant: DENSO CORPORATION, Kariya (JP)

(72) Inventors: Tsuyoshi Imai, Kariya (JP); Hiroyuki Kado, Kariya (JP); Mikine Kume, Kariya (JP)

(73) Assignee: DENSO CORPORATION, Kariya (JP)

( * ) Notice: Subject to any disclaimer, the term of this patent is extended or adjusted under 35 U.S.C. 154(b) by 460 days.

(21) Appl. No.: 16/847,816

(22) Filed: Apr. 14, 2020

(65) Prior Publication Data

US 2020/0332874 A1    Oct. 22, 2020

(30) Foreign Application Priority Data

Apr. 16, 2019 (JP) .................. 2019-077985

(51) Int. Cl.
| | |
|---|---|
| *F16H 1/32* | (2006.01) |
| *F16H 63/34* | (2006.01) |
| *F16H 61/32* | (2006.01) |

(52) U.S. Cl.
CPC ........... *F16H 1/32* (2013.01); *F16H 63/3466* (2013.01); *F16H 2001/325* (2013.01); *F16H 2061/326* (2013.01)

(58) Field of Classification Search
CPC ................ F16H 1/32; F16H 2001/325; F16H 2001/327; F16H 63/3466; F16H 63/3433; F16H 63/3408; F16H 2061/326; F16H 61/32; F16H 2001/323
See application file for complete search history.

(56) References Cited

U.S. PATENT DOCUMENTS

| | | | | |
|---|---|---|---|---|
| 5,286,237 A | * | 2/1994 | Minegishi ................. | F16H 1/32 475/178 |
| 2013/0203544 A1 | * | 8/2013 | Kobayashi ................ | F16H 1/32 475/169 |

(Continued)

FOREIGN PATENT DOCUMENTS

| | | |
|---|---|---|
| JP | 62-283236 | 12/1987 |
| JP | 2015-93492 | 5/2015 |
| WO | 2016/017417 | 2/2016 |

OTHER PUBLICATIONS

U.S. Appl. No. 16/847,953, to Kume, et al., entitled: "Rotary Actuator", filed Apr. 14, 2020 (18 pages).

(Continued)

*Primary Examiner* — Lori Wu
(74) *Attorney, Agent, or Firm* — Nixon & Vanderhye P.C.

(57) ABSTRACT

A rotary actuator is used in a shift-by-wire system for a vehicle. A speed reducer includes a ring gear and a sun gear and reduces a rotational speed of the motor. An output shaft outputs rotation of the motor at a reduced rotational speed by the speed reducer. A regulating pin is disposed in a fixing member and allows the sun gear to revolve around a rotational axis of the motor and to rotate about an eccentric axis. The regulating pin is a separate member from the fixing member. The regulating pin has a strength equal to or greater than a maximum torque reaction force received from the sun gear. A first difference in hardness between an engaging portion and the sun gear is set to be less than a second difference in hardness between the fixing member and the sun gear.

6 Claims, 11 Drawing Sheets

(56) References Cited

U.S. PATENT DOCUMENTS

2015/0219187 A1* 8/2015 Saito .................. F16H 1/32
                                                    475/149
2016/0348783 A1  12/2016 Shinkai et al.
2018/0266518 A1*  9/2018 Oe ..................... F16H 1/32
                                                    475/169

OTHER PUBLICATIONS

U.S. Appl. No. 16/847,974, to Kannou, et al., entitled: "Rotary Actuator", filed Apr. 14, 2020 (22 pages).
U.S. Appl. No. 16/847,989, to Kume, et al., entitled: "Rotary Actuator", filed Apr. 14, 2020 (20 pages).
U.S. Appl. No. 16/847,788 to Kume, et al., entitled: "Rotary Actuator", filed Apr. 14, 2020 (22 pages).
U.S. Appl. No. 16/847,801, to Kume, et al., entitled: "Rotary Actuator", filed Apr. 14, 2020 (26 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,854, to Naitou, et al., entitled: "Rotary Actuator", filed Apr. 14, 2020 (23 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).
U.S. Appl. No. 16/847,835, to Kannou, et al., entitled: "Rotary Actuator", filed Apr. 14, 2020 (18 pages).

* cited by examiner

ROTARY ACTUATOR

CROSS REFERENCE TO RELATED APPLICATIONS

This application is based on Japanese Patent Application No. 2019-077985 filed on Apr. 16, 2019, all of which is incorporated herein by reference.

TECHNICAL FIELD

The present disclosure relates to a rotary actuator.

BACKGROUND

A rotary actuator used as a driving unit for a shift-by-wire system for a vehicle has been known. For example, an actuator in which motion of a sun gear is restricted by a regulating pin in a speed reducer disposed between a rotational shaft and an output shaft of a motor. The regulating pin is integrally formed with a fixing member as a single component.

SUMMARY

One aspect of the present disclosure is a rotary actuator used in a shift-by-wire system for a vehicle. The actuator includes a motor, a speed reducer, an output shaft, a fixing member, and a regulating pin. The speed reducer includes a ring gear and a sun gear and that reduces a rotational speed of the motor. The sun gear meshes with the ring gear from an inside of the ring gear. The output shaft outputs rotation of the motor at a reduced rotational speed by the speed reducer. The fixing member is arranged around the speed reducer. The regulating pin is disposed in the fixing member. The regulating pin is configured to prevent the sun gear from moving while allowing the sun gear to revolve around a rotational axis of the motor and to rotate about an eccentric axis that is eccentric with the rotational axis. The regulating pin is a separate member from the fixing member. The regulating pin has a strength equal to or greater than a maximum torque reaction force received from the sun gear. The regulating pin has an engaging portion that is engaged with the sun gear. The difference in hardness between the engaging portion and the sun gear is defined as a first hardness difference. The difference in hardness between the fixing member and the sun gear is defined as a second hardness difference. The first hardness difference is set to be less than the second hardness difference.

DETAILED DESCRIPTION

Figure 1:
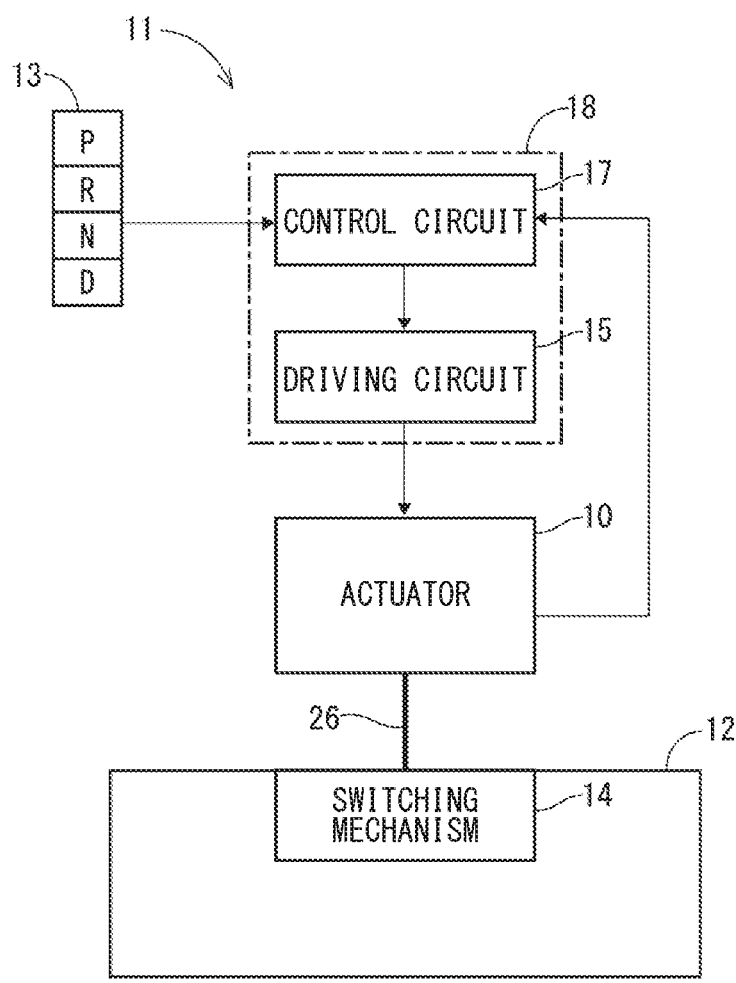
FIG. 1 is a schematic diagram showing a shift-by-wire system to which a rotary actuator according to a first embodiment is applied.

Hereinafter, a plurality of embodiments of a rotary actuator (hereinafter, referred to as an "actuator") will be described with reference to the drawings. In the embodiments, substantially the same components are denoted by the same reference numerals and description thereof is omitted.

To begin with, relevant technologies will be described only for understanding the following embodiments. In general, since a regulating pin is integrally formed with the fixing member as a single component, there is concerns that positional accuracy of the regulating pin may be deteriorated, that the strength of the regulating pin may become insufficient, and that the regulating pin may be worn out.

The present disclosure has been made in view of the above, and a rotary actuator that prevents deterioration in positional accuracy of a regulating pin, a lack of strength in the regulating pin, and wear of the regulating pin will be presented as a plurality of embodiments.

One aspect of the present disclosure is a rotary actuator used in a shift-by-wire system for a vehicle. The actuator includes a motor, a speed reducer, an output shaft, a fixing member, and a regulating pin. The speed reducer includes a ring gear and a sun gear and that reduces a rotational speed of the motor. The sun gear meshes with the ring gear from an inside of the ring gear. The output shaft outputs rotation of the motor at a reduced rotational speed by the speed reducer. The fixing member is arranged around the speed reducer. The regulating pin is disposed in the fixing member. The regulating pin is configured to prevent the sun gear from moving while allowing the sun gear to revolve around a rotational axis of the motor and to rotate about an eccentric axis that is eccentric with the rotational axis. The regulating pin is a separate member from the fixing member. The regulating pin has a strength equal to or greater than a maximum torque reaction force received from the sun gear. The regulating pin has an engaging portion that is engaged with the sun gear. The difference in hardness between the engaging portion and the sun gear is defined as a first hardness difference. The difference in hardness between the fixing member and the sun gear is defined as a second hardness difference. The first hardness difference is set to be less than the second hardness difference.

According to the one aspect, since the regulating pin is a separate member from the fixing member in which the regulating pin is disposed, it is possible to suppress a decrease in positional accuracy of the regulating pin. In addition, by providing the regulating pin with consideration of its strength and hardness difference, insufficient strength and wearing of the regulating pin can be avoided.

First Embodiment

The actuator is used as a driving unit for a shift-by-wire system of a vehicle.

(Shift-by-Wire System)

A configuration of the shift-by-wire system will be described with reference to FIGS. 1 and 2. As shown in FIG. 1, the shift-by-wire system 11 includes a shift operating device 13 that instructs a shift range of a transmission 12, the actuator 10 that drives a shift range switching mechanism 14 of the transmission 12, a driving circuit 15 that energizes the actuator 10, and a control circuit 17. The control circuit 17 controls the driving circuit 15 to drive the actuator 10 based on control signals for the shift range. The driving circuit 15 and the control circuit 17 configures an electronic control unit 18 (hereinafter, referred to as an ECU 18).

Figure 2:
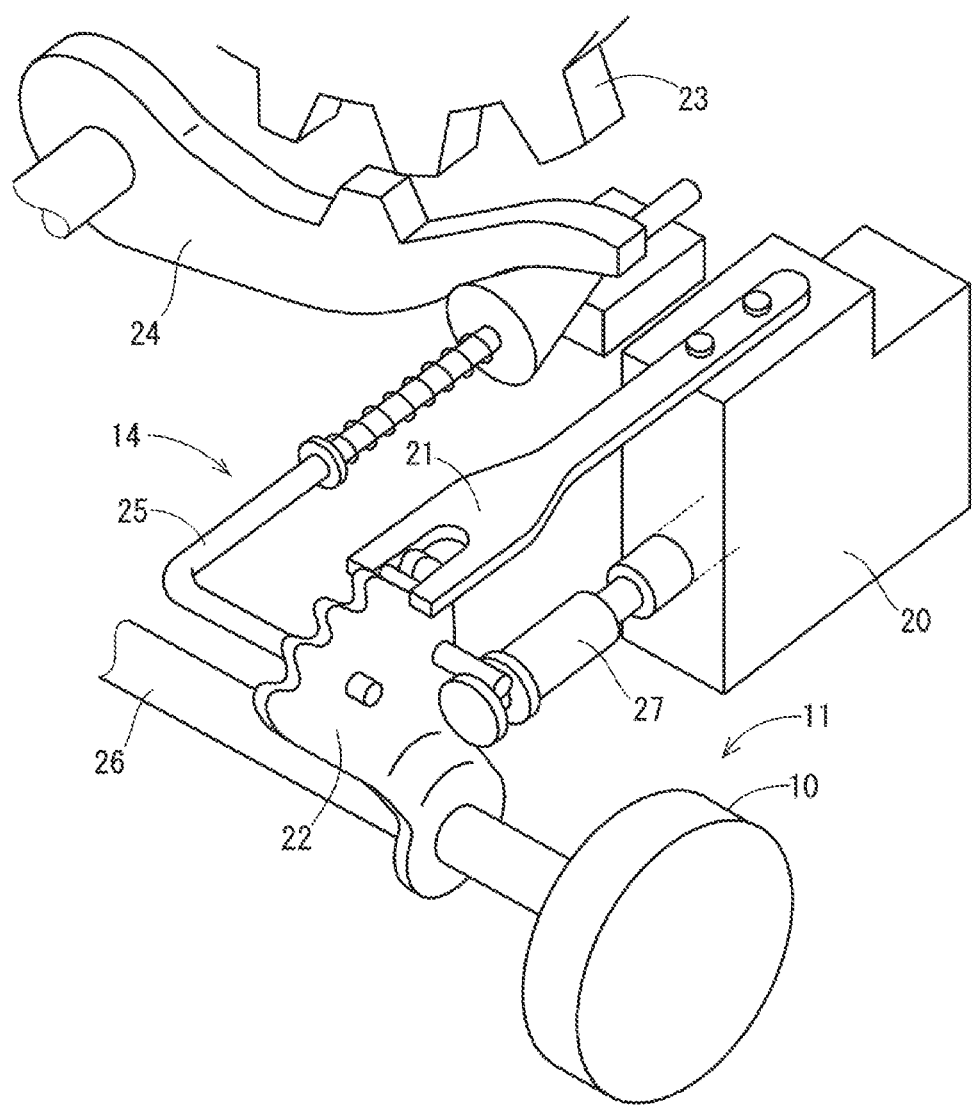
FIG. 2 is a diagram illustrating a shift range switching mechanism of FIG. 1.

As shown in FIG. 2, the shift range switching mechanism 14 includes a range switching valve 20 that controls a supply of hydraulic pressure to a hydraulic operating mechanism in the transmission 12, a detent spring 21 and a detent lever 22 that is configured to keep a shift range, a park rod 25 that prevents an output shaft from rotating by fitting a park pole 24 into a park gear 23 of the output shaft of the transmission 12 when the shift range is switched to a parking range, and a manual shaft 26 that rotates together with the detent lever 22.

The shift range switching mechanism 14 rotates the manual shaft 26 together with the detent lever 22 connected to the park rod 25 and a valve body 27 of the range switching valve 20 to shift the park rod 25 and the valve body 27 to positions corresponding to a target shift range. The shift-by-wire system 11 is connected to the actuator 10 to switch the shift range electrically.

(Actuator)

Figure 3:
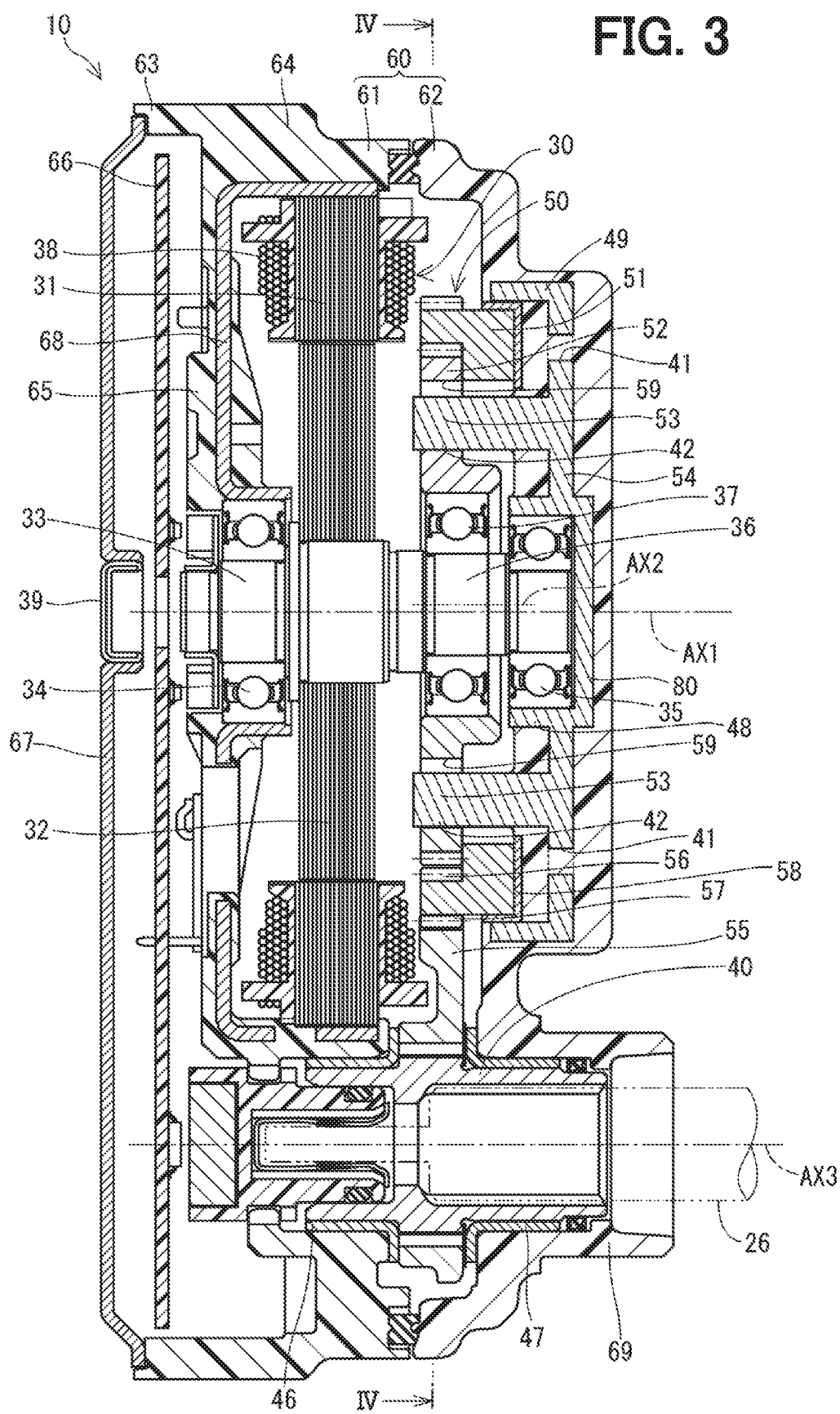
FIG. 3 is a cross-sectional view of the rotary actuator according to the first embodiment.

Next, the configuration of the actuator 10 will be described. As shown in FIG. 3, the actuator 10 includes a motor 30, as a driving power source, a speed reducer 50 that reduces a rotational speed of the motor 30, an output shaft 40 that outputs the rotation at a reduced speed, and a case 60 that houses the motor 30, the speed reducer 50, and the output shaft 40.

The case 60 includes a cylindrical upper case portion 61 and a cup-shaped lower case portion 62. A partition 65 is formed between one end 63 and the other end 64 of the upper case 61. A board 66 on which a drive circuit 15 and a control circuit 17 (see FIG. 1) are mounted is disposed inside the one end 63. The board 66 is fixed to the partition 65 by, for example, heat swaging. The board 66 is covered by a plate cover 67, thereby ensuring shielding (water proof) for the board 66. The lower case portion 62 is attached to the other end portion 64. The lower case portion 62 includes a cylindrical protruding portion 69 that protrudes away from the upper case 61. The manual shaft 26 is inserted into the cylindrical protrusion 69.

The motor 30 includes a stator 31 press-fitted into, and fixed to, a plate case 68 at the other end 64, a rotor 32 provided inside the stator 31, and a rotational shaft 33 that rotates about a rotation axis AX1 together with the rotor 32. The rotational shaft 33 is rotatably supported by both a bearing 34 disposed in the plate case 68 and a motor bearing 35 disposed in the lower case portion 62. Further, the rotational shaft 33 has an eccentric portion 36 eccentric with the rotation axis AX1 at a position on a side of the rotor 32 facing the lower case portion 62. The motor 30 is able to rotate bidirectionally by controlling a current supplied to a three-phase winding 38 constituting the stator 31 by the control circuit 17 (see FIG. 1) and is also able to stop at a desired rotational position. The plate cover 67 has a through hole, and a plug 39 is attached to the through hole. When a failure occurs, the rotational shaft 33 can be rotated manually after detaching the plug 39.

Figure 4:
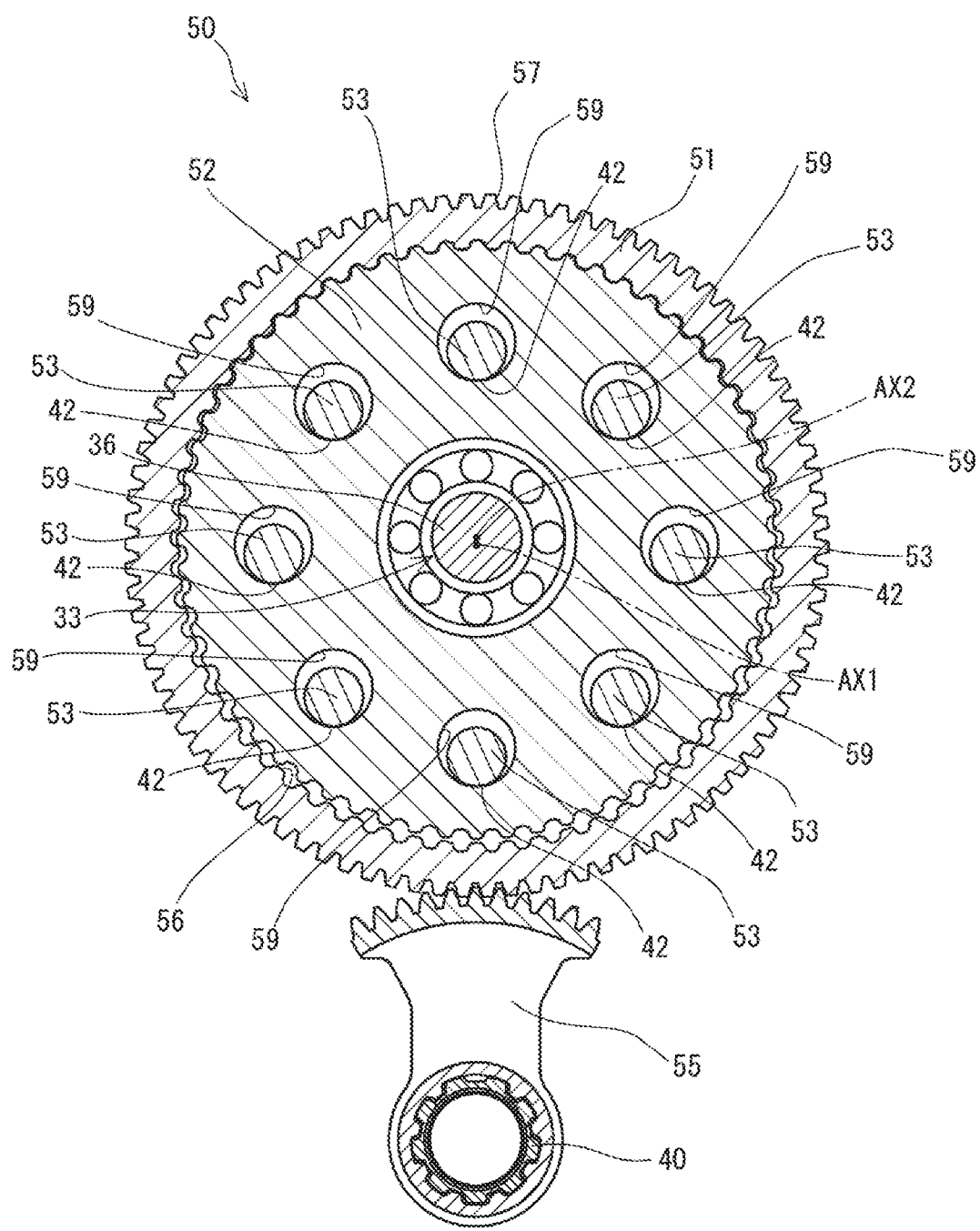
FIG. 4 is a sectional view of a speed reducer taken along line IV-IV of FIG. 3.

As shown in FIGS. 3 and 4, the speed reducer 50 includes a ring gear 51, a sun gear 52, and a driven gear 55. The ring gear 51 is a two-tooth gear and has internal teeth 56 and external teeth 57. The ring gear 51 is coaxially disposed with a rotational axis AX1 and is rotatably supported by a gear bearing 58 disposed in the lower case portion 62.

The sun gear 52 is rotatably supported about an eccentric axis AX2 by a bearing 37 fitted into the eccentric portion 36. The sun gear 52 meshes with, and is fits snugly inside, the ring gear 51. That is, the sun gear 52 meshes with the ring gear 51 from an inside of the ring gear 51. When the rotational shaft 33 rotates, the sun gear 52 performs planetary motion in which the sun gear 52 revolves around the rotational axis AX1 and rotates about the eccentric axis AX2. The sun gear 52 defines eight through holes 59 penetrating the sun gear 52 in the axial direction. The through holes 59 are arranged at equal intervals in the circumferential direction of the sun gear 52. The regulating pins 53 that engage with the corresponding through holes 59 restrict the sun gear 52 from moving while allowing the sun gear 52 to perform the planetary motion. The rotational speed of the sun gear 52 is reduced relative to the rotational speed of the rotational shaft 33 and the rotation of the sun gear 52 is transmitted to the ring gear 51.

The driven gear 55 is coaxially disposed with an output axis AX3 that is in parallel with AX1. The driven gear 55 meshes with the external teeth 57 to circumscribe the ring gear 51. That is, the driven gear 55 meshes with the external teeth 57 from an outside of the ring gear 51. The rotation transmitted to the ring gear 51 via engagement between the sun gear 52 and the internal teeth 56 is transmitted from the external teeth 57 to the driven gear 55. When the ring gear 51 rotates about the rotational axis AX1, the driven gear 55 rotates about the rotational axis AX3.

The output shaft 40 has a cylindrical shape and is provided coaxially with the rotation axis AX3. The partition 65 has a through support hole 89 coaxial with the rotation axis AX3. The output shaft 40 is rotatably supported about the rotation axis AX3 by a first flanged bush 46 fitted into the through support hole 89 and a second flanged bush 47 fitted inside the cylindrical projection 69. The driven gear 55 is fitted outwardly to the output shaft 40 and is connected to the output shaft 40 to transmit rotation. The manual shaft 26 is inserted into the output shaft 40 and is coupled to the output shaft 40 through, for example, spline fitting so as to transmit rotation.

The actuator 10 further includes a support member 54 and the regulating pins 53. The support member 54 includes a small cylinder 48, a large cylinder 49, and a bottom portion 80. The small cylinder 48 is radially, outwardly fit to the motor bearing 35 and supports the motor bearing 35. The large cylinder 49 is radially, outwardly fit to the gear bearing 58 and supports the gear bearing 58. The bottom part 80 is located at a position in the small and large cylinders 48, 49 away from the sun gear 52. The regulating pins 53 protrude from a region of the bottom 80 between the small cylinder 48 and the large cylinder 49 toward the sun gear 52. The support member 54 is embedded in the lower case portion 62 by insert molding and is held by the lower case portion 62. Further, the support member 54 defines through holes 41 penetrating the support member 54 in the axial direction of the rotational shaft 33. Each of the through holes 41 is located between the large cylinder 49 and the corresponding regulating pin 53 in the radial direction of the motor bearing 35. The plurality of through holes 41 are arranged at intervals in the circumferential direction of the motor bearing 35.

The regulating pins 53 are integrally formed with the support member 54 using the same material. Each of the regulating pins 53 is a separate member from the lower case portion 62 and has a strength equal to or greater than a maximum torque reaction force received from the sun gear 52. Each of the regulating pins 53 is located between the motor bearing 35 and the gear bearing 58 in the radial direction of the rotational shaft 33. The regulating pin 53 is inserted into the through hole 59 and is engaged with the inner wall of the through hole 59. The regulating pin 53 is configured to prevent the sun gear 52 from moving while allowing the sun gear 52 to revolve around the rotation axis of the motor 30 and to rotate about the eccentric axis that is eccentric with the rotation axis. The regulating pin 53 includes an engaging portion 42. A difference in hardness between the engaging portion 42 and the sun gear 52 is defined as a first hardness difference. A difference in hardness between the lower case portion 62 and the sun gear 52 is defined as a second hardness difference. The first hardness difference is set to be less than the second hardness difference in this embodiment.

The lower case portion 62 is disposed around the speed reducer 50 and is a fixing member for fixing the restricting pins 53.

As described above in the first embodiment, when the rotational shaft 33 rotates, the sun gear 52 performs planetary motion in which the sun gear 52 revolves around the rotational axis AX1 and rotates about the eccentric axis AX2. The restricting pins 53 are engaged with the through holes 59 of the sun gear 52 to restrict the sun gear 52 from moving while allowing for the planetary motion by the sun gear 52. Each of the regulating pins 53 is a separate member from the lower case portion 62, as a fixing member, and has a strength equal to or greater than a maximum torque reaction force received from the sun gear 52. The first hardness difference between the engaging portion 42 of the regulating pin 53 and the sun gear 52 is set to be less than the second hardness difference between the lower case portion 62 and the sun gear 52.

Since the regulating pin 53 is a separate member from the lower case portion 62, it is possible to avoid deteriorating positional accuracy with respect to the rotation shaft 33. On the contrary, if the regulating pin 53 is integrally formed with a resin housing as a single member, the positional accuracy of the restricting pin 53 would be decreased due to resin molding shrinkage. Further, when the regulating pin 53 is integrally formed with a metal housing as a single member, the positional accuracy of the regulating pin 53 would be affected depending on processing accuracy when the regulating pin 53 is manufactured by processing the molded housing.

Since the regulating pin 53 has a strength equal to or greater than the maximum torque reaction force received from the sun gear 52, the regulating pin 53 can be prevented from breaking. Since the first hardness difference between the engagement portion 42 of each of the regulating pins 53 and the sun gear 52 is set to be less than the second hardness difference between the lower case portion 62 and the sun gear 52, the regulating pins 53 can be more effectively prevented from being worn out as compared with a situation where the regulating pins 53 are integrally formed with the lower case portion 62 as a single member.

The regulating pins 53 are held in the lower case portion 62 by molding. Therefore, the regulating pins 53 can be easily fixed.

The support member 54 supports the motor bearing 35 and the gear bearing 58. Further, since the regulating pins 53 are integrally formed with the support member 54 as a single member, it is possible to prevent the regulating pins 53 from being offset from the respective bearing, and therefore a decrease in the transmission efficiency of the gear can be suppressed.

Further, the support member 54 defines the through holes 41 penetrating the support member 54 in the axial direction of the rotational shaft 33. The plurality of through holes 41 are formed at intervals in the circumferential direction of the motor bearing 35. Each of the through holes 41 serves as a stopper to cause the support member 54 to engage with the lower case portion 62.

Second Embodiment

Figure 5:
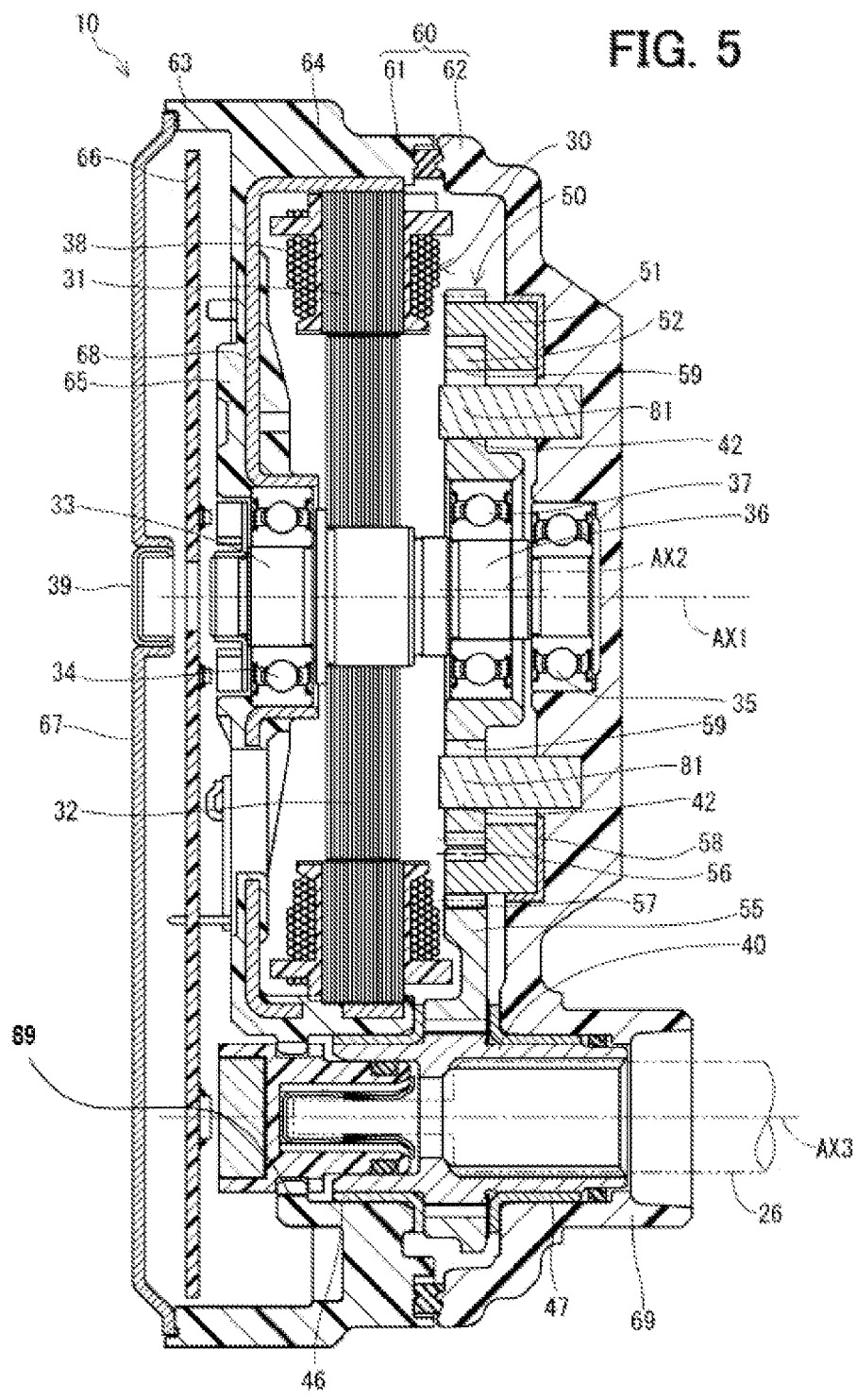
FIG. 5 is a cross-sectional view of the rotary actuator according to a second embodiment.

The second embodiment is the same as the first embodiment, except for the following configuration. As shown in FIG. 5, in this embodiment, the support member 54 described in the first embodiment is eliminated, and each of regulating pins 81 constitutes a single member and is held by the lower case portion 62 by press-fitting. Each of the regulating pins 81 is a separate member from the lower case portion 62 and has a strength equal to or greater than a maximum torque reaction force received from the sun gear 52. The first hardness difference between the engaging portion 42 of each of the regulating pins 81 and the sun gear 52 is set to be less than the second hardness difference between the lower case portion 62 and the sun gear 52. As described above, even when the regulating pins 81 are held by the lower case portion 62 by press-fitting into the lower case portion 62, if the regulating pins 81 have the same configuration as that of the first embodiment, the same advantages as that of the first embodiment can be obtained.

Third Embodiment

Figure 6:
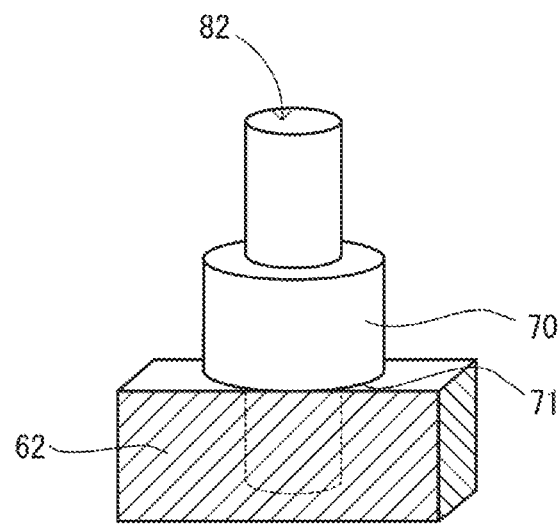
FIG. 6 is a schematic diagram of a regulating pin according to a third embodiment.
Figure 7:
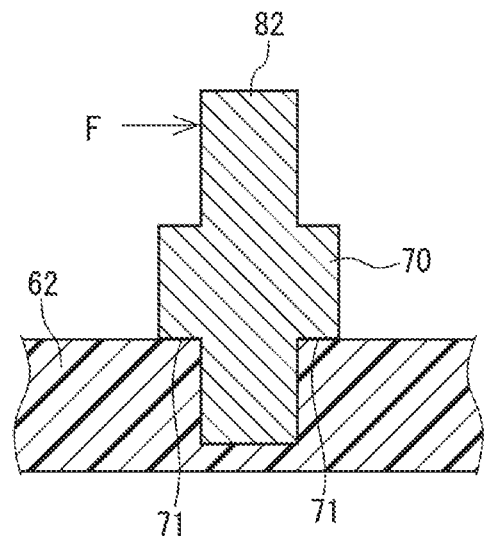
FIG. 7 is a vertical cross-sectional view of FIG. 6.

The third embodiment is the same as the first embodiment, except for the following configuration. As shown in FIGS. 6 and 7, the regulating pin 82 is disposed to protrude from the lower case portion 62 toward the sun gear and includes a flange 70 at a proximal portion of the regulating pin 82. The flange 70 includes a contact portion 71 that is in contact with the lower case portion 62 in the axial direction of the regulating pin 82. The contact portion 71 is an annular surface and is in contact with the lower case portion 62 across the entire circumference of the regulating pin 82. With this configuration, the regulating pin 82 can be restricted from falling when the regulating pin 82 receives the torque reaction force F from the sun gear 52.

Fourth Embodiment

Figure 8:
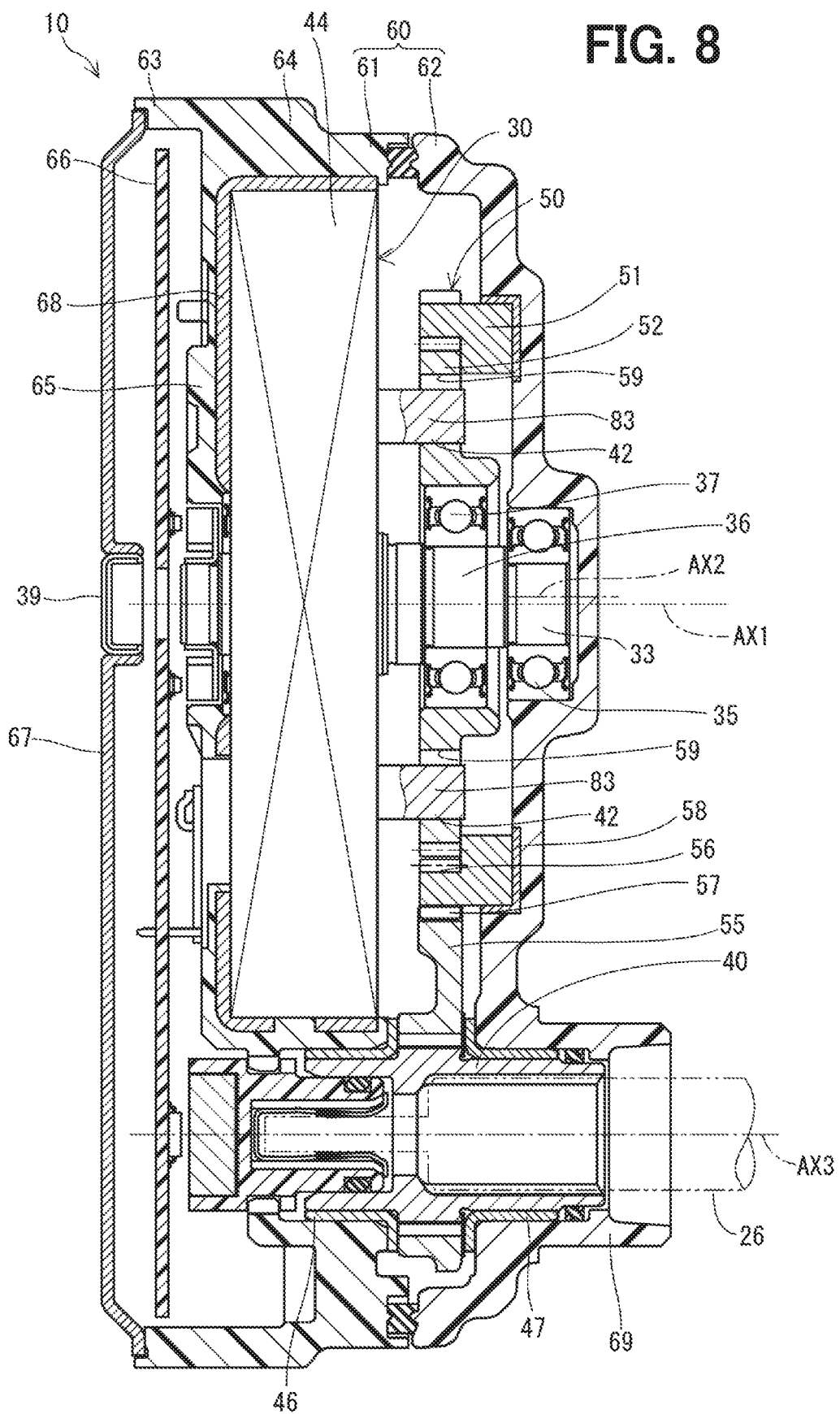
FIG. 8 is a cross-sectional view of a rotary actuator according to a fourth embodiment.

The fourth embodiment is the same as the first embodiment, except for the following configuration. As shown in FIG. 8, the regulating pins 83 are held by molding by the motor case 44 of the motor 30 that is located around the speed reducer 50. In FIG. 8, the motor 30 is shown in a simplified manner.

The motor case 44 is disposed around the speed reducer 50 and is a fixing member for fixing the regulating pins 83.

Each of the regulating pins 83 is a separate member from the motor case 44 and has a strength equal to or greater than a maximum torque reaction force received from the sun gear 52. The first hardness difference between the engaging portion 42 of each of the regulating pins 83 and the sun gear 52 is set to be less than the second hardness difference between the motor case 44 and the sun gear 52.

The following advantages are achieved by the restriction pins 83 having the above configuration.

Since each of the regulating pins 83 is a separate member from the motor case 44 as a fixing member, it is possible to suppress a decrease in positional accuracy.

Since each of the regulating pins 83 has a strength equal to or greater than the maximum torque reaction force received from the sun gear 52, the regulating pins 83 can be prevented from breaking. Since the first hardness difference between the engagement portion 42 of the regulating pin 83 and the sun gear 52 is set to be less than the second hardness difference between the motor case 44 and the sun gear 52, the regulating pin 83 can be more effectively prevented from being worn out as compared with a situation where the regulating pin 83 is integrally formed with the lower case portion 62 as a single member.

That is, if the lower case portion 62 in the first embodiment and the motor case 44 in the third embodiment are treated as fixed members, the advantages of the third embodiment are similar to the advantages of the first embodiment.

Figure 9:
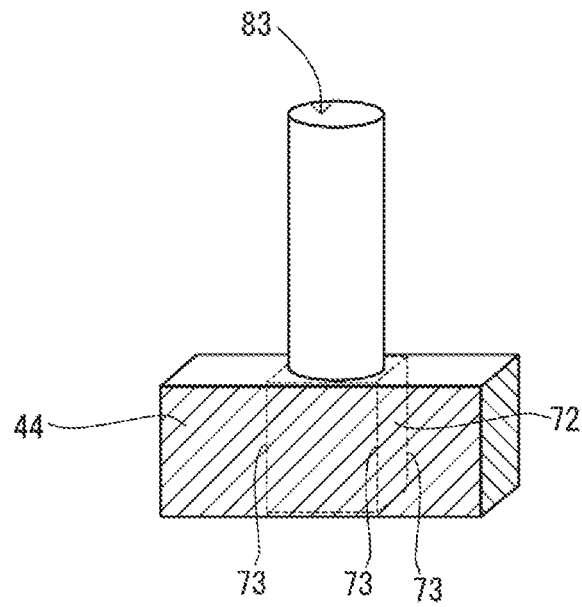
FIG. 9 is a schematic diagram of the regulating pin according to the fourth embodiment.
Figure 10:
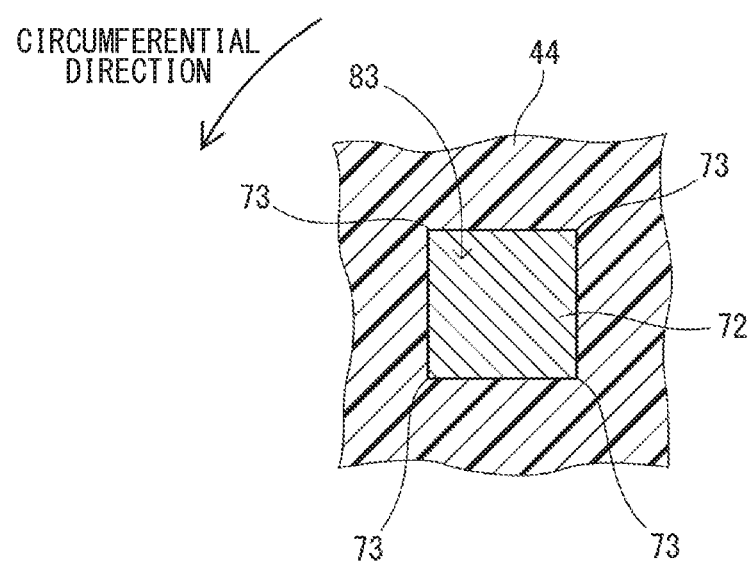
FIG. 10 is a plan cross-sectional view of a circumferential stopper of FIG. 9.

Each of the regulating pins 83 has one end having a rectangular parallelepiped shape and is molded with the motor case 44, as shown in FIGS. 9 and 10. The one end serves as a circumferential stopper 72 that engages with the motor case 44 in the circumferential direction of the regulating pin 83. The circumferential stopper 72 includes a plurality of corners 73 located along the circumferential direction. The circumferential stopper 72 prevents the motor case 44 from moving in the circumferential direction by the corners 73 engaging with the motor case 44. Since the regulating pin 83 has the circumferential stopper 72, the regulating pin 83 can be prevented from coming off.

Fifth Embodiment

Figure 11:
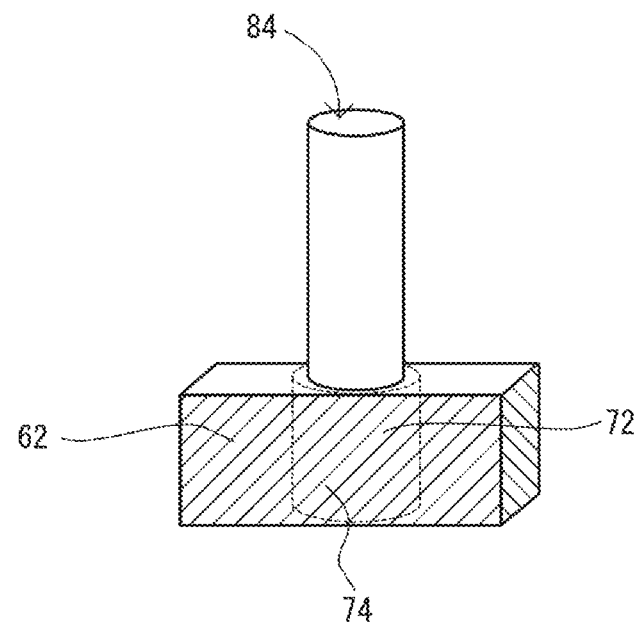
FIG. 11 is a schematic diagram of a regulating pin according to a fifth embodiment.
Figure 12:
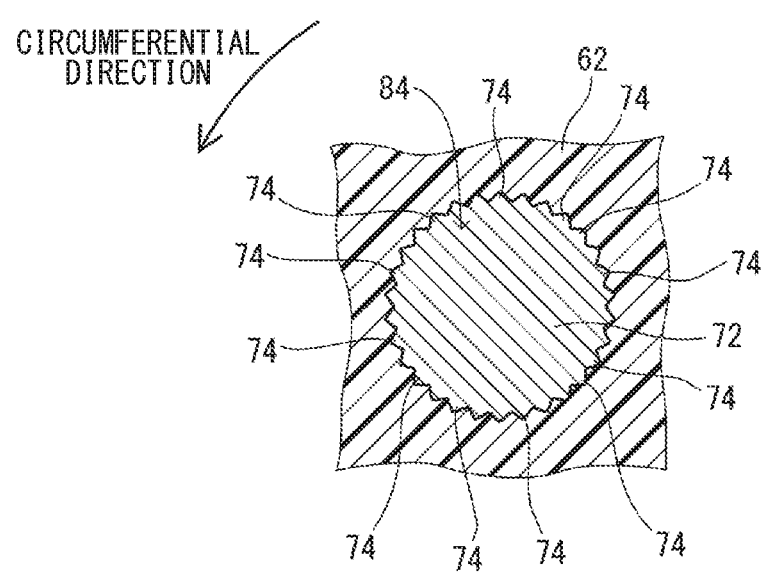
FIG. 12 is a plan cross-sectional view of a circumferential stopper of FIG. 11.

The fifth embodiment is the same as the second embodiment, except for the following configuration. As shown in FIGS. 11 and 12, the regulating pin 84 protrudes from the lower case portion 62 toward the sun gear. One end of the regulating pin 84 is molded with the lower case portion 62, and knurling, which is a process of forming fine irregularities, is applied to a radially outer surface of the lower case portion 62. The one end of the regulating pin 84 serves as a circumferential stopper 72 that engages with the lower case 62 in the circumferential direction of the regulating pin 84. A plurality of protrusions 74 formed on the circumferential stopper 72 serve as circumferential stoppers. In FIG. 12, the size of the irregularities of the knurl relative to the regulating pin 84 is exaggeratedly illustrated for easy understanding purposes only. Since the regulating pin 84 has the circumferential stoppers, the regulating pin 84 can be prevented from coming off.

Sixth Embodiment

Figure 13:
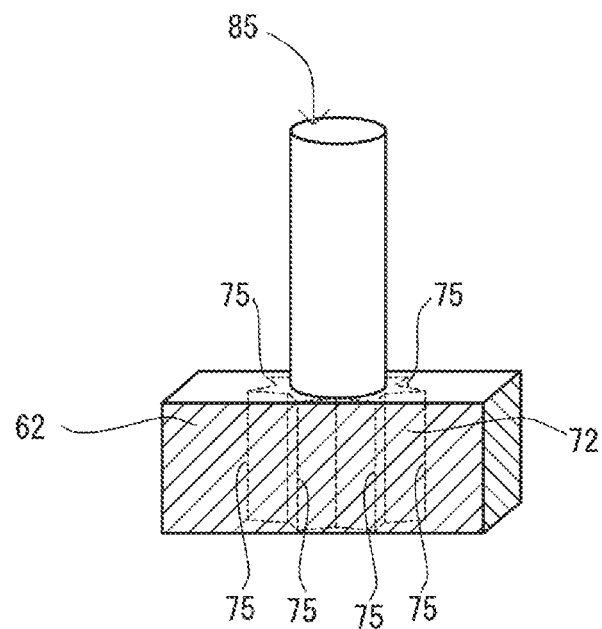
FIG. 13 is a schematic diagram of a regulating pin according to a sixth embodiment.
Figure 14:
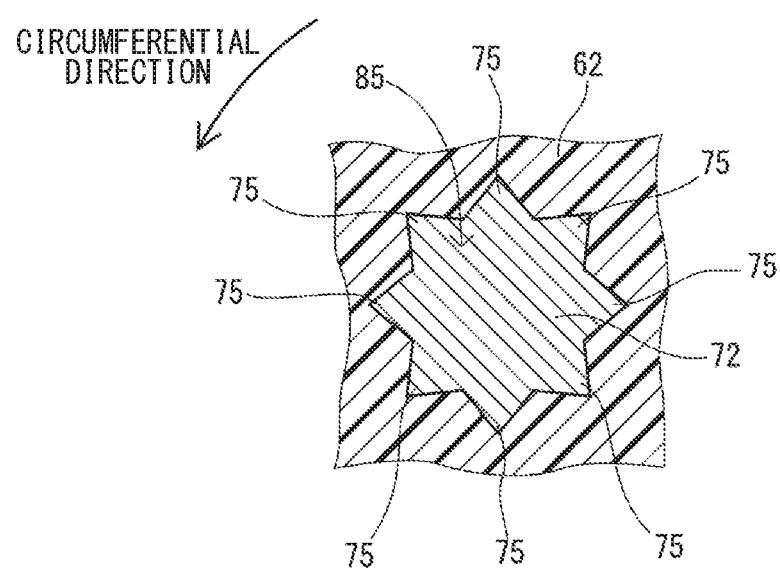
FIG. 14 is a plan cross-sectional view of a circumferential stopper of FIG. 13.

The sixth embodiment is the same as the second embodiment, except for the following configuration. As shown in FIGS. 13 and 14, the regulating pin 85 protrudes from the lower case portion 62 toward the sun gear. One end of the regulating pin 85 is formed as a columnar member having a star-shaped polygonal cross section. The one end of the regulating pin 85 is molded with the lower case portion 62. The one end serves as a circumferential stopper 72 that engages with the lower case 62 in the circumferential direction of the regulating pin 85. A plurality of protrusions 75 formed on the circumferential stopper 72 serve as circumferential stoppers. Since the regulating pin 85 has the circumferential stoppers, the regulating pin 85 can be prevented from coming off.

Seventh Embodiment

Figure 15:
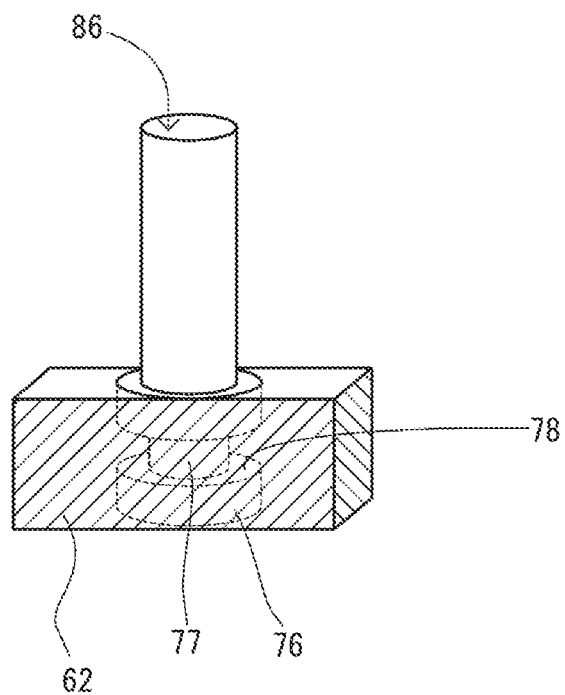
FIG. 15 is a schematic diagram of a regulating pin according to a seventh embodiment.
Figure 16:
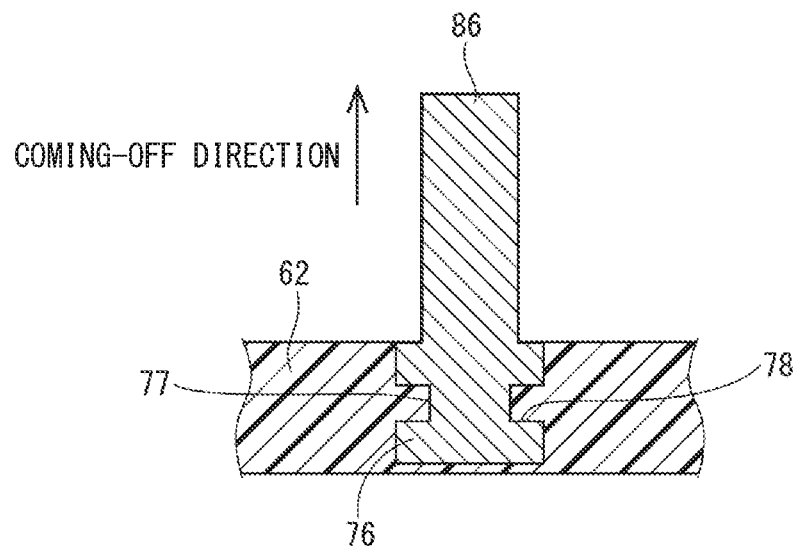
FIG. 16 is a vertical cross-sectional view of FIG. 15.

The seventh embodiment is the same as the second embodiment, except for the following configuration. As shown in FIGS. 15 and 16, the regulating pin 86 protrudes from the lower case portion 62 toward the sun gear. One end of the regulation pin 86 has an annular groove 77 extending in the circumferential direction of the regulation pin 86 and is molded on the lower case portion 62. The one end of the regulating pin 86, which is opposite the sun gear, serves as an axial stopper 76 that engages with the lower case 62. One side surface 78 of the annular groove 77 is engaged with the lower case portion 62 and therefore acts as a stopper. Since the regulating pin 86 has the axial stopper 76, the regulating pin 86 can be prevented from coming off.

OTHER EMBODIMENTS

In another embodiment of the present invention, the support member or the regulating pin is not limited to the press-fitting and the molding, and may be held by screwing or caulking.

In another embodiment of the present disclosure, the first hardness difference between the engaging portion of the regulating pin and the sun gear may be set less than the second hardness difference between the fixing member and the sun gear by performing a surface treatment on the regulating pin. In short, to make the hardness of the engaging portion of the regulating pin relatively high, a relatively hard material may be used, or a part of the regulating pin may be made relatively high by performing a surface treatment or the like.

In yet another embodiment of the present invention, the flange of the regulation pin may have a portion that is in contact with the fixing member. That is, the entire regulating pin is not necessarily in contact with the regulating pin in the circumferential direction. In short, the flange may have any shape as long as it comes into contact with the fixing member in the axial direction.

In yet another embodiment of the present disclosure, the circumferential stopper of the regulating pin may have irregularities formed in a part of the regulation pin in the circumferential direction. In short, the circumferential stopper may have any shape as long as it comes into contact with the fixing member in the axial direction.

In yet another embodiment of the present disclosure, the axial stopper of the regulating pin may have irregularities formed in a part of the regulation pin in the circumferential direction. In short, the circumferential stopper may have any shape as long as it comes into contact with the fixing member in the axial direction to interfere with the fixing member.

In yet another embodiment of the present disclosure, the number of through holes of the sun gear is not limited to eight, and may be any numbers as long as the motion of the sun gear is restricted while the planetary motion is allowed.

In yet another embodiment of the present invention, the through hole may not be provided in the bottom of the support member. In a case where the through hole is provided in the support member, the through-hole may be provided not only between the large cylinder and the regulating pin but also provided at a position radially inward of the regulating pin.

The present disclosure is not limited to the embodiments described above, and various modifications are possible within the scope of the present disclosure without departing from the spirit of the invention.

The invention claimed is:

1. A rotary actuator used in a shift-by-wire system for a vehicle, the actuator comprising:
   a motor;
   a speed reducer that includes a ring gear and a sun gear and that reduces a rotational speed of the motor, the sun gear meshing with the ring gear from an inside of the ring gear;
   an output shaft that outputs rotation of the motor at a reduced rotational speed by the speed reducer;
   a fixing member that is arranged around the speed reducer; and
   a regulating pin that is disposed in the fixing member, the regulating pin configured to prevent the sun gear from moving while allowing the sun gear to revolve around a rotational axis of the motor and to rotate about an eccentric axis that is eccentric with the rotational axis, wherein
   the regulating pin is a separate member from the fixing member,
   the regulating pin has a strength equal to or greater than a maximum torque reaction force received from the sun gear,
   the regulating pin has an engaging portion that is engaged with the sun gear,
   a difference in hardness between the engaging portion and the sun gear is defined as a first hardness difference,
   a difference in hardness between the fixing member and the sun gear is defined as a second hardness difference, and
   the first hardness difference is set to be less than the second hardness difference.

2. The rotary actuator according to claim 1, wherein the regulating pin is held in the fixing member by molding or press-fitting.

3. The rotary actuator according to claim 1, further comprising:
   a motor bearing that rotatably supports a rotational shaft of the motor;
   a gear bearing that rotatably supports the ring gear; and
   a support member that supports the motor bearing and the gear bearing, wherein
   the regulating pin and the support member are integrally formed as a single member.

4. The rotary actuator according to claim 1, wherein the regulating pin protrudes from the fixing member toward the sun gear and includes a flange at a proximal portion of the regulating pin, and
   the flange is in contact with the fixing member in an axial direction of the regulating pin.

5. The rotary actuator according to claim 1, wherein the regulating pin includes a circumferential stopper that engages with the fixing member in a circumferential direction of the regulating pin.

6. The rotary actuator according to claim 1, wherein the regulating pin includes an axial stopper that engages with the fixing member at one end of the regulating pin opposite the sun gear.

* * * * *